(12) United States Patent
Finn et al.

(10) Patent No.: US 7,881,998 B2
(45) Date of Patent: Feb. 1, 2011

(54) SYSTEM AND METHOD FOR A PERFORMANCE INCENTIVE PLAN

(75) Inventors: Brian Finn, Brookville, NY (US); Sean Brady, New York, NY (US); Susan Mink, Summit, NJ (US)

(73) Assignee: Credit Suisse Securities (USA) LLC, New York, NY (US)

( * ) Notice: Subject to any disclaimer, the term of this patent is extended or adjusted under 35 U.S.C. 154(b) by 799 days.

(21) Appl. No.: 11/294,034

(22) Filed: Dec. 5, 2005

(65) Prior Publication Data

US 2006/0143102 A1    Jun. 29, 2006

Related U.S. Application Data

(60) Provisional application No. 60/633,946, filed on Dec. 7, 2004.

(51) Int. Cl.
*G06Q 40/00*    (2006.01)
(52) U.S. Cl. .............................. 705/35; 705/36; 705/37; 705/38; 705/39
(58) Field of Classification Search ....................... None
See application file for complete search history.

(56) References Cited

U.S. PATENT DOCUMENTS

| | | | | |
|---|---|---|---|---|
| 5,987,429 | A * | 11/1999 | Maritzen et al. | 705/31 |
| 6,055,511 | A * | 4/2000 | Luebbering et al. | 705/14 |
| 6,092,047 | A * | 7/2000 | Hyman et al. | 705/36 R |
| 6,161,096 | A * | 12/2000 | Bell | 705/36 R |
| 6,338,042 | B1 * | 1/2002 | Paizis | 705/11 |
| 6,609,111 | B1 * | 8/2003 | Bell | 705/36 R |
| 7,353,200 | B1 * | 4/2008 | Brumberg | 705/37 |
| 7,529,701 | B2 * | 5/2009 | Shields et al. | 705/35 |
| 7,613,642 | B2 * | 11/2009 | Ryan | 705/35 |
| 2002/0004771 | A1 * | 1/2002 | McCain | 705/35 |
| 2002/0029177 | A1 * | 3/2002 | Smisek | 705/30 |
| 2002/0042771 | A1 * | 4/2002 | Shields et al. | 705/37 |

(Continued)

OTHER PUBLICATIONS

Notes to Consolidated Financial Statements; Penton Media, Inc. Company/Corporate Profile/Review; Oct. 13, 2005, pp. 22-56.*

(Continued)

*Primary Examiner*—Thomas Dixon
*Assistant Examiner*—Benjamin S Fields
(74) *Attorney, Agent, or Firm*—Walter G. Hanchuk; Chadbourne & Parke LLP

(57) ABSTRACT

The invention relates to a novel incentive and compensation plan for motivating and rewarding employees, and a computer system for implementing said plan. It is an object of the present invention to provide a stock-based incentive and compensation plan that rewards employees based on the performance of the company. The present invention provides methods and systems for providing an employee incentive and compensation plan, which include deferring a portion of an employee's compensation for a period of time. The financial performance of the employee's company is evaluated over the selected period of time, and the employee's total deferred compensation is converted into a number of units based on the amount deferred, the average share price of the company stock, and the financial performance of the company. The employee's units are valued based on the average share price of the company stock, and the total compensation is paid to participating employees as an incentive and compensation plan.

17 Claims, 2 Drawing Sheets

U.S. PATENT DOCUMENTS

2006/0085252 A1* 4/2006 Kersenbrock ............... 705/14
2006/0143102 A1* 6/2006 Finn et al. .................... 705/35
2006/0224451 A1* 10/2006 Kerschbrock et al. ......... 705/14

OTHER PUBLICATIONS

Jefferies Group Inc. Company/Corporate Profile/Review; Apr. 4, 2003, pp. 1-7.*
Gen-Probe Website: http://www.gen-probe.com/pdfs/Gen-Probe%202006%20Proxy%20(Final).pdf pp. 41-44, Mar. 2006.
Edgar Online Website, Report of the Compensation Committee on Executive Compensation.: http://sec.edgar-online.com/2003/04/04/0000950148-03-000768/Section11.asp pp. 23-25, filing date: Apr. 4, 2003.
National Australia Bank Group Website. Annual Financial Report 2005. Notes to the financial statements: http://www.nabgroup.com/vgnmedia/downld/AnnualFinancialReport2005FinRptPart3.pdf pp. 238-239.
Mirant Website. 2002 Annual Report: http://www.mirant.com/investor_relations/pdfs/MirantCombobook.pdf pp. 3-18.
Edgar Online Website. Penton Media, Inc. Quarterly report. For the quarterly period ended Sep. 30, 2004: http://edgar.brand.edgar-online.com/EFX_dll/EDGARpro.dll?FetchFilingHTML1?SessionID=LKNsjDYNND-_2OO&ID=3957408 pp. 18-42.
Boeing Website. Compensation Committee Report on Executive Compensation: http://www.boeing.com/companyoffices/financial/finreports/annual/04proxy/item1a.html (2004) pp. 2-4.
Letter from chairman. INTEL Website: http://download.intel.com/intel/annualreports/Proxy_2005.pdf (Mar. 29, 2005) pp. 11-16.
Statement of Additional Information. Guidestone Funds Website: https://www.guidestonefunds.org/NR/rdonlyres/19C7D5C7-EC1D-431F-88D0-0231BFDE1C8B/0/2126_SAI.pdf (Jun. 30, 2006) pp. 60-62.

* cited by examiner

SYSTEM AND METHOD FOR A PERFORMANCE INCENTIVE PLAN

PRIORITY AND RELATED APPLICATION

This application claims priority to U.S. Provisional Application No. 60/633,946 filed on Dec. 7, 2004, which is hereby incorporated by reference in its entirety.

BACKGROUND OF INVENTION

The invention relates to a novel incentive and compensation plan for motivating and rewarding employees, and a computer system for implementing said plan.

Effective employees are important to the success of any business. Understanding this, businesses are continuously searching for ways to attract and retain employees who are self-driven, efficient, and productive. One known method for doing so is to provide incentive plans for rewarding those employees who meet or exceed certain performance criteria with cash or non-cash bonuses.

Many known incentive plans reward employees with bonuses in the form of shares of company stock. Stock-based incentive plans are effective, especially with respect to managers, since they provide employees with an opportunity to share in the growth potential of a company, and give employees the incentive to foster the company's growth. However, these known stock-based incentive programs reward employees based on their individual performance. They do not reward employees based on the performance of the company, or on the performance of the company's stock. As a result, existing stock-based incentive plans poorly align the interests of the employee and the interests of the company's shareholders.

SUMMARY OF THE INVENTION

It is an object of the present invention to provide a stock-based incentive and compensation plan that rewards employees based on the performance of the company, and that thus properly aligns the interests of the company's employees with those of the company's shareholders. It is further an object of the present invention to provide a computer-based system for implementing said plan.

In accordance with an exemplary embodiment of the present invention, employees defer a certain portion of their compensation for a period of time, such as for example, five years. The employee's deferred compensation is converted into a certain number of units using a predetermined formula, each unit representing a number of shares of stock that the employee may potentially receive as an incentive bonus at the end of the five-year deferral period.

In accordance with the present exemplary embodiment, a multiplier may be applied to the employee's number of units depending on a particular metric that measures how well the company has performed financially. In the present exemplary embodiment, that metric may be the annual earnings growth of the company. However, other metrics may also be employed, either in addition to or as an alternative to the annual earnings growth. Such other metrics may include return on equity (ROE), earnings per share (EPS), earnings, comparative earnings year over year or for corresponding subsequent years, including, but not limited to, e.g., trailing twelve months earnings, or any other recognized metric of institution and/or business unit earning improvement or profitability growth.

The multiplier applied to the employee's units may be, for example, any number in the range of zero to a selected upper limit such as, for example, three, as set by the firm. So, for example, if the company experiences an annual earnings growth of 24 percent, the employee may receive a unit multiplier of "3," tripling the employee's number of units. On the other hand, an annual earnings growth of 17 percent may result in no unit multiplier being applied at all.

In accordance with this exemplary embodiment, the employee's units may settle into a number of shares of company stock per unit depending on the price of the company's shares at the time of settlement. The number of shares per unit may be, for example, any number between zero and two. Thus, for example, if the share price of the company's stock is 80 at the time of settlement, each employee's unit may settle for 1.9 shares. If the share price is 30 or less, the employee may receive no shares at all.

DETAILED DESCRIPTION OF THE PREFERRED EMBODIMENTS

It is an object of the present invention to provide a stock-based incentive and compensation plan that rewards employees based on the performance of the employee's company or particular business unit. This reward system properly aligns the interests of the company's employees with those of the company's shareholders. It is a further object of the present invention to provide a computer-based system for implementing the stock-based incentive and compensation plan. It is also understood that the systems and methods disclosed herein can be provided and/or performed at one location, or performed over a plurality of locations using a plurality of facilities, machines, and/or computer systems.

Figure 1:
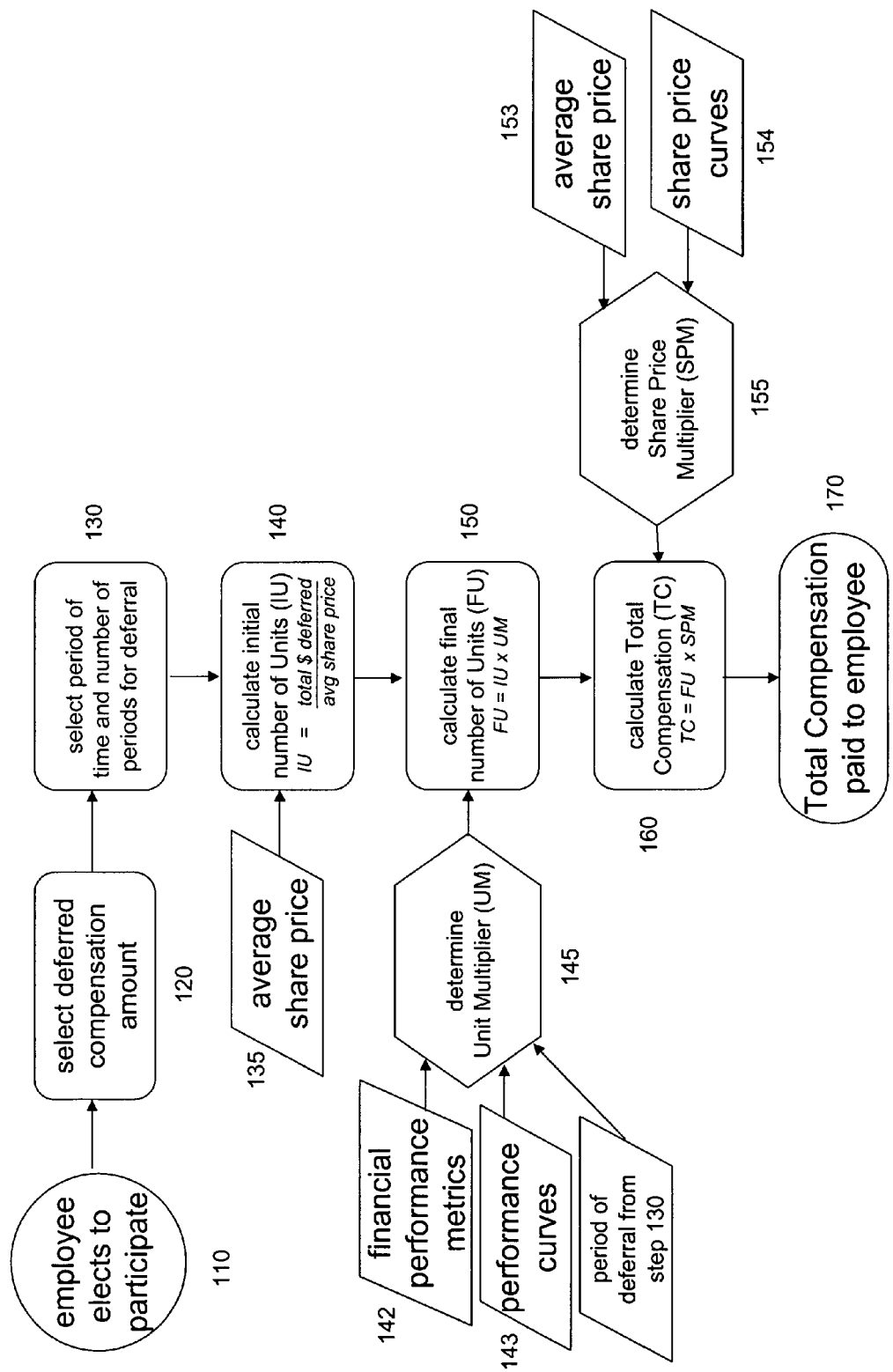
FIG. 1 illustrates a process flow diagram of the stock-based incentive and initiative plan.

Referring to FIG. 1, an employee can elect to participate in his/her company's stock-based incentive and compensation plan ("the plan") in step 110. The employee, now a participant, in step 120 selects the amount of compensation to be deferred per period. In step 130, the participant selects a length and number of periods over which the deferral will occur. The deferral period in step 130 can be measured using any time period, for example, years, months or weeks. The participant's company can impose a minimum or maximum limit on the deferral period or number of periods that are selectable by participant. The deferral period could also be set as a fixed non-adjustable length of time for vesting purposes. The deferral period's unit of measure and any required maximum or minimum limit can be established in accordance with the participant's company policy. Imposing a minimum, maximum, or fixed deferral period is not a critical feature of the instant invention, as any such limit will work within the preferred embodiment of the instant invention.

The entire amount of the participant's deferred compensation is awarded in the form of Units. The Units are paid to the participant as part of a total compensation ("TC"), and is based on the equivalent number of shares of company stock owned at maturity. The total compensation awarded at maturity is based on two criteria: (1) financial performance of the participant's company, or a particular business group within the company, and (2) the average share price of the participant's company.

In step 140, participant's total deferred compensation is converted to an initial number of Units. The initial number of Units in step 140 is based on the amount of deferred compensation from step 120 over the deferral period of step 130 and a share price 135 of the participant's company of employment averaged over a second period of time. The initial number of Units 140 is calculated by dividing the amount of the participant's total deferred compensation, i.e., the deferred compensation per period multiplied by the number of periods of step 130, by the share price 135 averaged over the second period of time. Because the plan rewards participants based on the performance of the participant's company of employment, the stock that is averaged and divided into the participant's total deferred compensation is preferably stock that is representative of the participant's company of employment. The period of time over which the average is calculated can be adjusted to compensate for a volatile or involatile market. The initial number of Units 140 will be included in the participant's Total Compensation when awarded.

Figure 2:
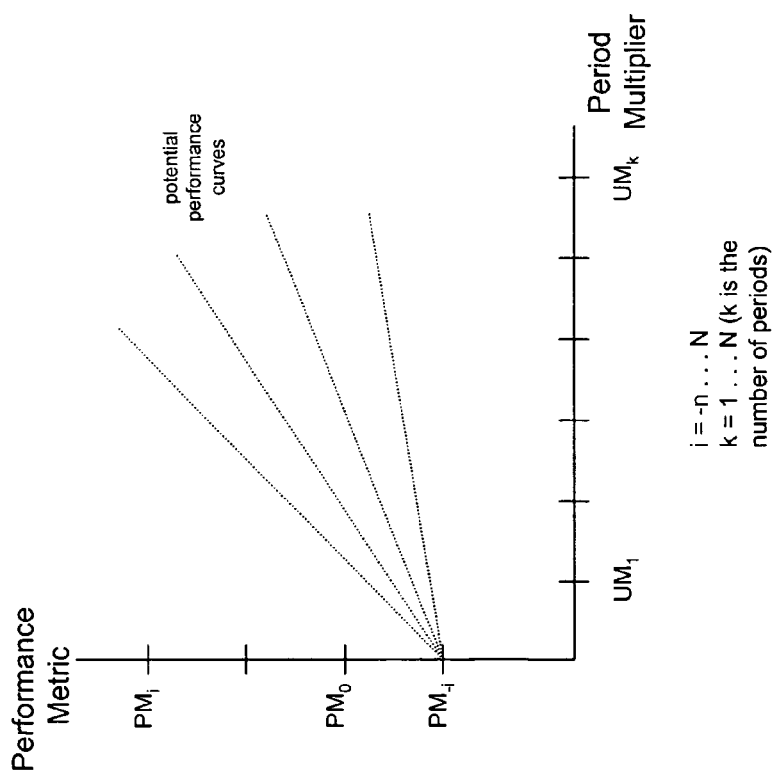
FIG. 2 illustrates the relationship between a financial performance metric and a corresponding period multiplier.

Step 150 calculates the participant's final number of units by applying a Unit Multiplier, which is determined in step 145, to the initial number of Units calculated from step 140. The Unit Multiplier in step 145 is calculated by considering a financial performance metric 142 of the participant's company or business unit, a performance curve 143 as shown in FIG. 2, and the participant's period of deferral of step 130. The financial performance metric 142 is selected by the participant's company, and can be the annual earnings growth, return on equity, earnings per share, earnings, comparative earnings year over year, or a combination thereof. In FIG. 2, a Period Multiplier corresponds to the identified financial performance metric 142, and depends on the performance curve 143 selected by the participant's company. The performance curve 143 selected indicates the company's desired elasticity of the Period Multiplier to the identified financial performance metric 142. Elasticity is the sensitivity of the Period Multiplier to the change in the financial performance metric 142. The Period Multiplier is based on the financial performance of the participant's company, or particular business unit within the company, during the participant's total deferral time and is determined for each period of deferral.

Returning to FIG. 1, the Unit Multiplier in step 145 is calculated by averaging the Period Multipliers of each period. In step 150, the Unit Multiplier is multiplied by the initial number of Units of step 140 to calculate the participant's final number of Units. The Unit Multiplier 145 has the effect of increasing or decreasing the employee's initial number of Units from step 140. Adjustments to the Performance Metric used in FIG. 2 can be made in the event of changes in accounting conventions, unforeseen restructuring charges and legacy tax, as well as legal and credit items. This has the effect of adjusting a participant's final number of Units of step 150 based on the calculated and/or adjusted Unit Multiplier of step 145. The participant's employer can establish a minimum or maximum limit for the Unit Multiplier in accordance with company policy. Imposing a limit, however, is not a critical feature of the instant invention, and as such any imposed limitation will work within the preferred embodiments of the instant invention.

Figure 3:
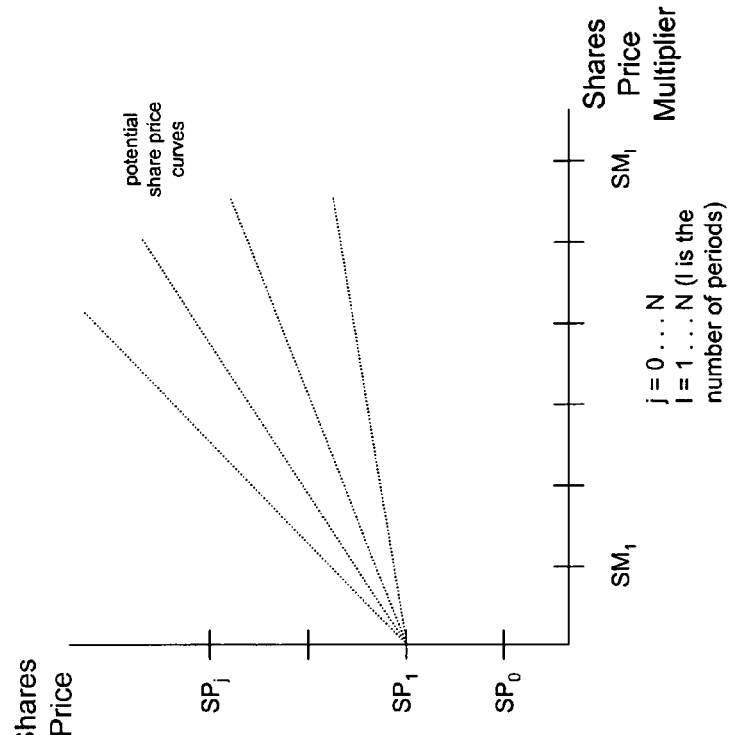
FIG. 3 illustrates the relationship between a share price and a corresponding share price multiplier.

Step 160 calculates the participant's Total Compensation in terms of awarded shares of company stock by applying a Share Price Multiplier of step 155 to the participant's final number of Units of step 150. The Share Price Multiplier of step 155 is based on a share price 153 of the participant's company stock averaged over a third period of time close to settlement, and a share price curve 154 as shown in FIG. 3. Referring to FIG. 3, the Share Price Multiplier corresponds to the participant's company stock average share price 153, and depends on the share price curve 154 selected by the participant's company. The share price curve 154 is an indication of the company's desired elasticity of the Share Price Multiplier to an average share price of the company's stock. The Share Price Multiplier of step 155 can be adjusted by averaging the daily volume weighted average of the participant's company share price for some period of time, known as a third period of time, prior to award date. For example, the average can be over a three-month period beginning on the first business day of the calendar year in which the end of the deferral period of award date occurs.

Step 160 determines the Total Compensation paid to the participant by multiplying the Share Price Multiplier 155 by the participant's final number of Units of Step 150. In step 170, the calculated amount of step 160 is paid to the participant as part of the incentive and compensation plan.

It may be useful to set forth an exemplary embodiment of the stock-based incentive and compensation plan discussed above. An employee begins by electing to participate in the plan, and selects an amount of compensation to defer for a given period of time. In the exemplary embodiment, the employee now a participant, elects to defer $10,000 per year over a five year period for a total deferment of $50,000. The five year period in this example is of fixed duration, is non-adjustable, and is established by the participant's company of employment. In this example, 20% of the total deferred amount is vested every year. The deferred compensation is then converted into units.

Converting the total amount deferred into Units, the participant's total deferred amount of $50,000 is divided by the average of the company's stock over a second period of time selected by participant's company. In this example the second period of time is five days prior to award settlement, and the average price per share over the five day period is $50. As a result, the participant's initial number of units is calculated to be 1000 initial Units ($50,000÷$50=1000 units).

The participant's final number of units are determined based on the financial performance of the participant's company or business unit over the period of deferral. A Period Multiplier is calculated by evaluating a financial performance metric of the company or employee's particular business unit over an increment of the period of deferral. In the exemplary embodiment, the financial performance metric can be return on equity (ROE). The ROE for each increment, or in this case one year, of the five-year period can be determined. Using a performance curve in FIG. 2, the ROE corresponds to the appropriate Period Multiplier. At the end of the five year period the five Period Multipliers are averaged to determine a Unit Multiplier. In the exemplary embodiment, the company's average ROE over the five years can be 15%. According to the curve selected in FIG. 2, 15% may correspond to an average Period Multiplier, or Unit Multiplier, of one. In the exemplary embodiment, the participant's employer can set a maximum limit on the Unit Multiplier, for example, at three. The Unit Multiplier (1×) is applied to the participant's number of Units, and in this case, the final number of Units remains 1000 (1000 units×1=1000 units).

The final number of units are converted to a number of shares of stock using a Share Price Multiplier. The Share Price Multiplier is determined by evaluating the company's average share price over a third period of time. In the exemplary embodiment, the average company share price may be $60. According to a selected share price curve in FIG. 3, the corresponding Share Price Multiplier may be 1.5. In this embodiment, the share price is calculated by averaging the share price of the participant's company stock over a three-month period beginning on the first business day of the calendar year in which the fifth anniversary of the grant date occurs. The participant's employer can set a maximum limit on the Share Price Multiplier, for example, at two. Participant's initial number of Units is worth 1.5 share for each unit. Participant is awarded 1500 shares of company stock as the Total Compensation (1.5 Units per share×1000 Units).

Those of ordinary skill in the art will appreciate that the foregoing discussion of certain embodiments and preferred embodiments are illustrative only, and does not limit the spirit and scope of the present invention, which is limited only by the claims set forth below.

We claim:

1. A computer-implemented method of providing an employee incentive and compensation plan, comprising:
    deferring a portion of an employee's compensation over a first period of time;
    selecting a financial performance metric representative of a financial performance of said employee's company;
    converting by a computer said employee's deferred compensation into an initial number of units by dividing said total deferred compensation by a stock share price of the employee's company averaged over a second period of time;
    determining by the computer a financial performance value as an average of the financial performance metric over the first period of time;
    correlating by the computer the determined financial performance value to a unit multiplier;
    converting by the computer said employee's initial number of units into a final number of units based on the correlated unit multiplier;
    determining by the computer a share price value as an average stock share price of the employee's company over a third period of time;
    correlating by the computer the determined share price value to a share price multiplier;
    converting by the computer said final number of units into a number of shares of stock based on the correlated share price multiplier; and
    providing a total compensation plan to said employee after said first period of time wherein said total compensation plan includes said number of shares of stock.

2. The method of claim 1, wherein said financial performance metric relates to a financial performance of said employee's business unit within said employee's company.

3. The method of claim 1, wherein said financial performance metric is annual earnings growth.

4. The method of claim 1, wherein said financial performance metric is return on equity.

5. The method of claim 1, wherein said financial performance metric is earnings per share.

6. The method of claim 1, wherein said financial performance metric is net earnings.

7. The method of claim 1, wherein said financial performance metric is comparative earnings.

8. An apparatus for providing an employee incentive and compensation plan, comprising:
    a memory;
    a processor disposed in communication with said memory, and configured to issue a plurality of processing instructions stored in the memory, wherein the processor issues instructions to:
    defer a portion of an employee's compensation over a first period of time;
    select a performance metric representative of a financial performance of said employee's company;
    convert said employee's deferred compensation into an initial number of units by dividing said total deferred compensation by a stock share price of the employee's company averaged over a second period of time;
    determine a financial performance value as an average of the financial performance metric over the first period of time;
    correlate the determined financial performance value to a unit multiplier;
    convert said employee's initial number of units into a final number of units based on the correlated unit multiplier;
    determine a share price value as an average stock share price of the employee's company over a third period of time;
    correlate the determined share price value to a share price multiplier;
    convert said final number of units into a number of shares of stock based on the correlated share price multiplier; and
    provide a total compensation plan to said employee after said first period of time wherein said total compensation plan includes said number of shares of stock.

9. The method of claim 1, wherein said converting said employee's initial number of units into a final number of units is done by a multiplying the unit multiplier by the initial number of units.

10. The method of claim 9, wherein said unit multiplier is calculated by averaging period multipliers of each period.

11. The method of claim 10, wherein said period multipliers correspond to the identified financial performance metric.

12. The method of claim 1, wherein the determined financial performance value is correlated to the unit multiplier using a financial performance curve.

13. The method of claim 12, wherein the financial performance curve is linear.

14. The method of claim 1, wherein the unit multiplier is limited to a maximum value set by the employee's company.

15. The method of claim 1, wherein the determined share price value is correlated to the share price multiplier using a share price curve.

16. The method of claim 15, wherein the share price curve is linear.

17. The method of claim 1, wherein the share price multiplier is limited to a maximum value set by the employee's company.

* * * * *